US012647787B2

(12) United States Patent
Kunz et al.

(10) Patent No.: US 12,647,787 B2
(45) Date of Patent: Jun. 2, 2026

(54) NETWORK FUNCTION REALLOCATION WITH SECURITY CONTEXT

(71) Applicant: Lenovo (Singapore) Pte. Ltd., New Tech Park (SG)

(72) Inventors: Andreas Kunz, Ladenburg (DE); Sheeba Backia Mary Baskaran, Friedrichsdorf (DE); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 543 days.

(21) Appl. No.: 18/013,211

(22) PCT Filed: Jun. 28, 2021

(86) PCT No.: PCT/IB2021/055777
§ 371 (c)(1),
(2) Date: Dec. 27, 2022

(87) PCT Pub. No.: WO2021/260670
PCT Pub. Date: Dec. 30, 2021

(65) Prior Publication Data
US 2023/0262460 A1 Aug. 17, 2023

Related U.S. Application Data

(60) Provisional application No. 63/044,891, filed on Jun. 26, 2020.

(51) Int. Cl.
*H04W 12/08* (2021.01)
*H04W 8/08* (2009.01)
(Continued)

(52) U.S. Cl.
CPC ............. *H04W 12/08* (2013.01); *H04W 8/08* (2013.01); *H04W 12/02* (2013.01); *H04W 12/069* (2021.01)

(58) Field of Classification Search
CPC ..... H04W 12/06; H04W 12/08; H04W 12/02; H04W 12/069; H04W 8/08
See application file for complete search history.

(56) References Cited

U.S. PATENT DOCUMENTS

2021/0014781 A1* 1/2021 Lanev ................... H04W 48/18
2021/0351925 A1* 11/2021 Deng ................ H04W 12/0433
(Continued)

FOREIGN PATENT DOCUMENTS

| WO | 2019185758 A1 | 10/2019 |
| WO | 2021030946 A1 | 2/2021 |
| WO | 2021031065 A1 | 2/2021 |

OTHER PUBLICATIONS

PCT/IB2021/055777, "Notification of Transmittal of the International Search Report and the Written Opinion of the International Searching Authority, or the Declaration", International Searching Authority, Sep. 7, 2021, pp. 1-12.
(Continued)

*Primary Examiner* — Margaret G Webb
(74) *Attorney, Agent, or Firm* — Kunzler Needham Hilton

(57) ABSTRACT

Apparatuses, methods, and systems are disclosed for network function reallocation with security context. One apparatus includes a processor and a transceiver. The processor is configured to detect, at a first network function of a mobile wireless communication network, that the first network function cannot serve a requested network slice from a user equipment ("UE") device. The transceiver is configured to send, from the first network function via a second network function, a reroute message to a third network function of the mobile wireless communication network. The reroute message includes an initial non-access stratum ("NAS") message retrieved during NAS security mode command ("SMC") procedure with the UE device and a security configuration. The third network function uses the initial
(Continued)

NAS message and the security configuration to determine a security context for the UE device and serve the requested network slice from the UE device.

20 Claims, 11 Drawing Sheets

(51) Int. Cl.
   H04W 12/02        (2009.01)
   H04W 12/069       (2021.01)

(56) References Cited

U.S. PATENT DOCUMENTS

| | | | | |
|---|---|---|---|---|
| 2022/0053445 A1* | 2/2022 | Deng | ................... | H04L 9/0861 |
| 2022/0303935 A1* | 9/2022 | Olsson | .................. | H04W 12/06 |
| 2022/0338079 A1* | 10/2022 | Wifvesson | .......... | H04W 12/068 |

OTHER PUBLICATIONS

3GPP, "3rd Generation Partnership Project; Technical Specification Group Services and System Aspects; Study on the security of Access and Mobility Management Function (AMF) re-allocation; (Release 17)", 3GPP TR 33.864 V0.4.0, Mar. 2021, pp. 1-54.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.

* cited by examiner

200

UE 201

NG-RAN 203

Source AMF 205

Target AMF 207

AUSF 211

1. NAS Initial UE message

213

2a. Optionally Identity Request

215

2b. AUSF Selection and Authentication/Security, use new parameter to indicate feature "AMF change for isolated slices" in NAS SMC

217

3. Store Authentication Result and $K_{AUSF}$/$K_{SEAF}$ and SUPI/SUCI

218

4. Optional steps according to TS 23.502

219

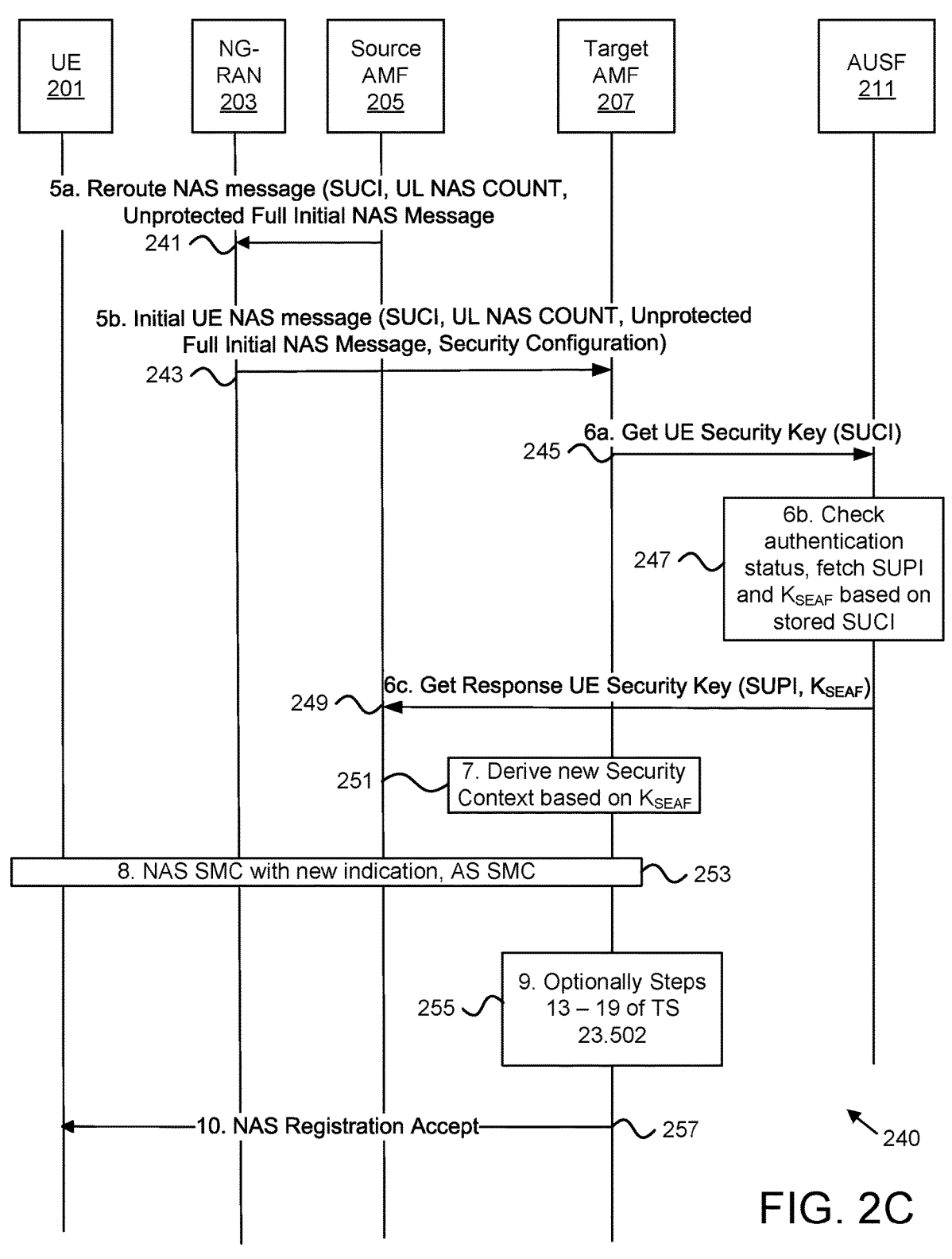

5a. Reroute NAS message (SUCI, UL NAS COUNT, Unprotected Full Initial NAS Message
241

5b. Initial UE NAS message (SUCI, UL NAS COUNT, Unprotected Full Initial NAS Message, Security Configuration)
243

6a. Get UE Security Key (SUCI)
245

6b. Check authentication status, fetch SUPI and $K_{SEAF}$ based on stored SUCI
247

6c. Get Response UE Security Key (SUPI, $K_{SEAF}$)
249

7. Derive new Security Context based on $K_{SEAF}$
251

8. NAS SMC with new indication, AS SMC
253

9. Optionally Steps 13 – 19 of TS 23.502
255

10. NAS Registration Accept
257

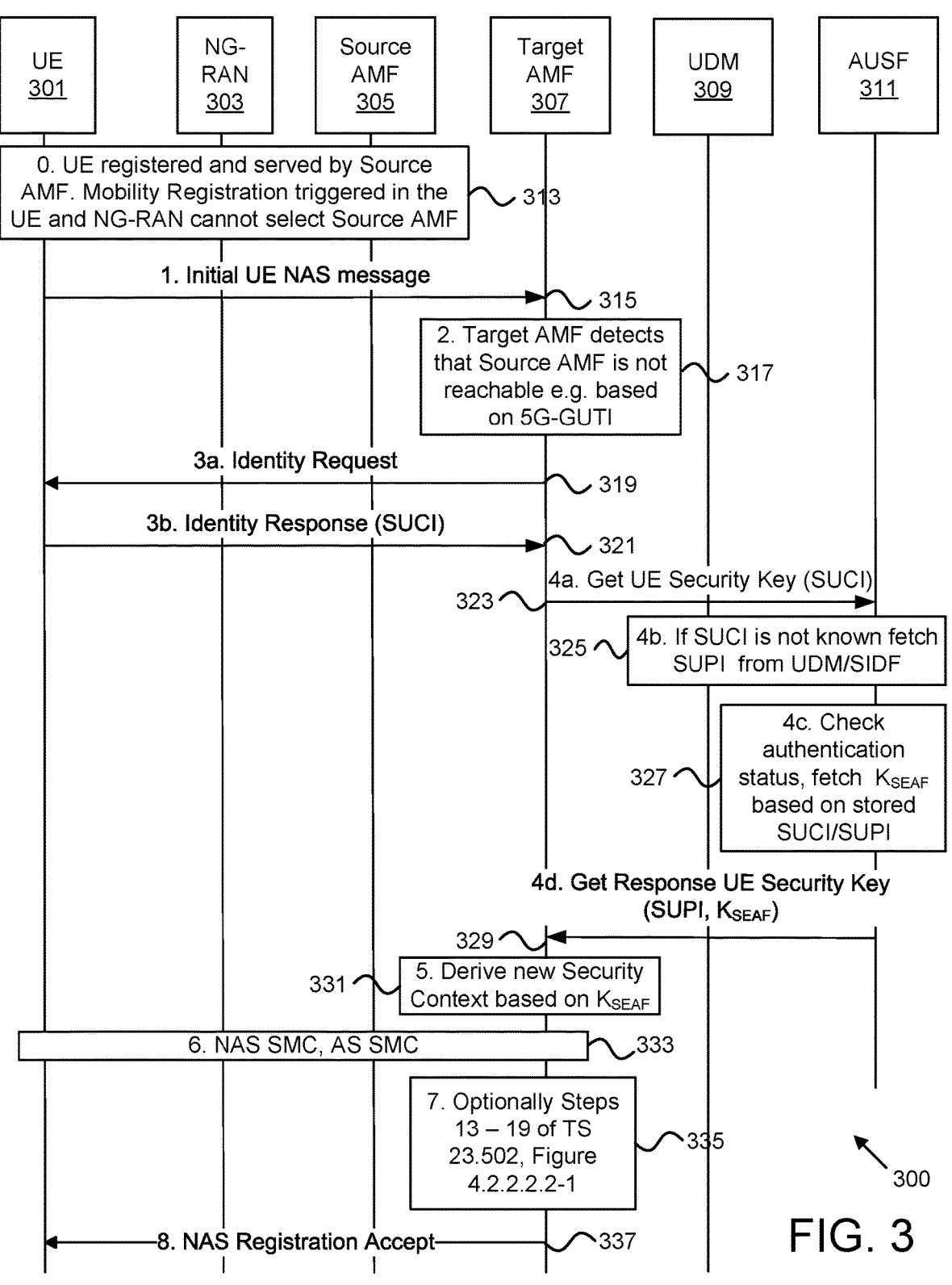

| UE 301 | NG-RAN 303 | Source AMF 305 | Target AMF 307 | UDM 309 | AUSF 311 |

0. UE registered and served by Source AMF. Mobility Registration triggered in the UE and NG-RAN cannot select Source AMF ~313

1. Initial UE NAS message ~315

2. Target AMF detects that Source AMF is not reachable e.g. based on 5G-GUTI ~317

3a. Identity Request ~319

3b. Identity Response (SUCI) ~321

4a. Get UE Security Key (SUCI) 323

4b. If SUCI is not known fetch SUPI from UDM/SIDF 325

4c. Check authentication status, fetch $K_{SEAF}$ based on stored SUCI/SUPI 327

4d. Get Response UE Security Key (SUPI, $K_{SEAF}$) 329

5. Derive new Security Context based on $K_{SEAF}$ 331

6. NAS SMC, AS SMC ~333

7. Optionally Steps 13 – 19 of TS 23.502, Figure 4.2.2.2.2-1 ~335

8. NAS Registration Accept ~337

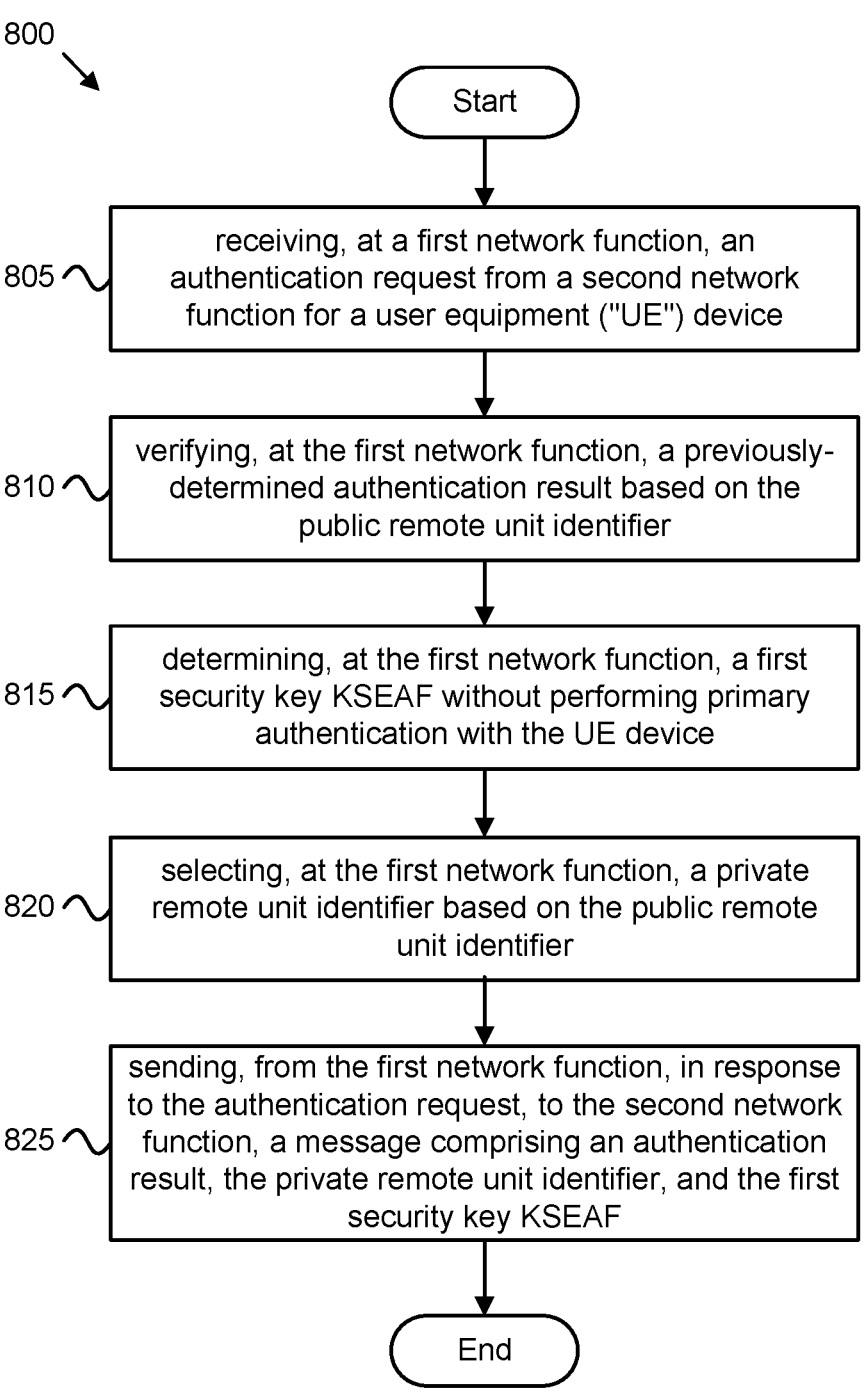

800

Start

805 — receiving, at a first network function, an authentication request from a second network function for a user equipment ("UE") device 810 — verifying, at the first network function, a previously-determined authentication result based on the public remote unit identifier 815 — determining, at the first network function, a first security key KSEAF without performing primary authentication with the UE device 820 — selecting, at the first network function, a private remote unit identifier based on the public remote unit identifier 825 — sending, from the first network function, in response to the authentication request, to the second network function, a message comprising an authentication result, the private remote unit identifier, and the first security key KSEAF End

FIG. 8

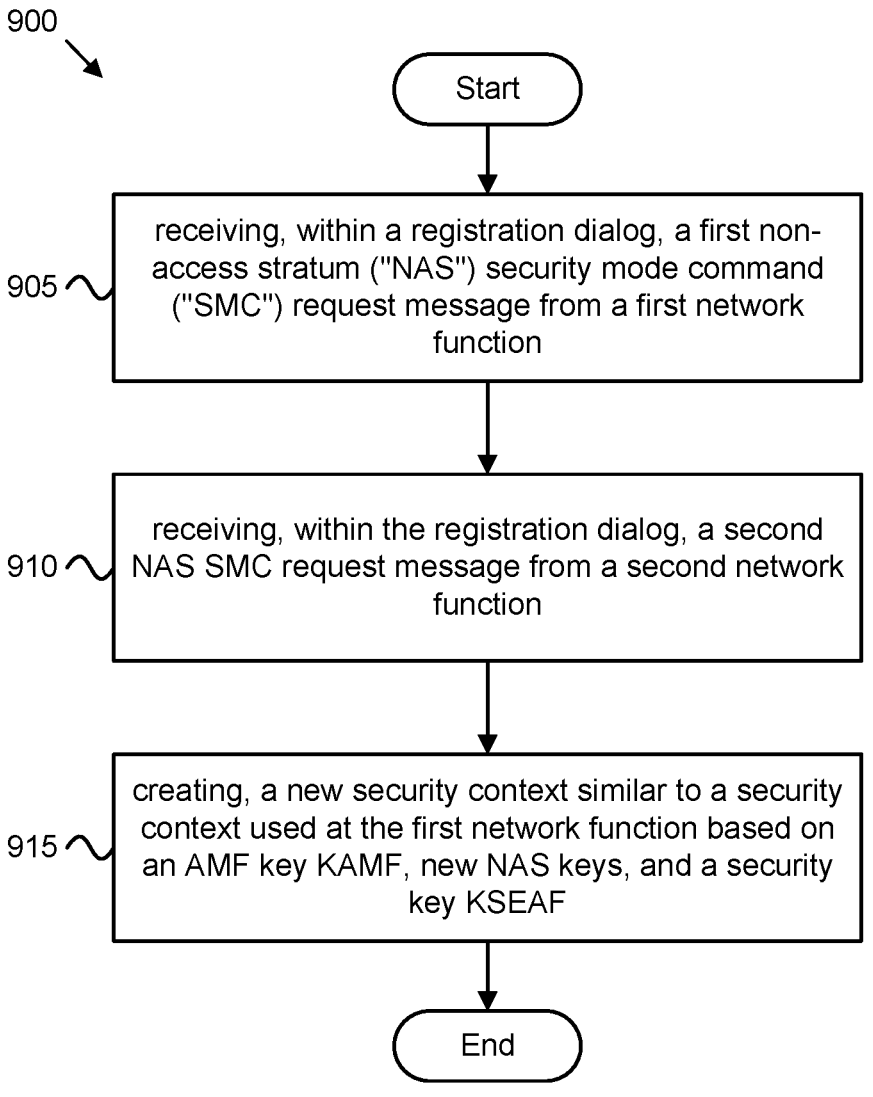

900

Start

905 — receiving, within a registration dialog, a first non-access stratum ("NAS") security mode command ("SMC") request message from a first network function 910 — receiving, within the registration dialog, a second NAS SMC request message from a second network function 915 — creating, a new security context similar to a security context used at the first network function based on an AMF key KAMF, new NAS keys, and a security key KSEAF End

FIG. 9

NETWORK FUNCTION REALLOCATION WITH SECURITY CONTEXT

CROSS-REFERENCE TO RELATED APPLICATIONS

This application claims priority to U.S. Provisional Patent Application No. 63/044,891 entitled "AMF REALLOCATION WITH SECURITY CONTEXT RECREATION" and filed on Jun. 26, 2020, for Andreas Kunz, et al., which is incorporated herein by reference.

FIELD

The subject matter disclosed herein relates generally to wireless communications and more particularly relates to network function reallocation with security context.

BACKGROUND

In certain wireless communication systems, a User Equipment device ("UE") is able to connect with a fifth-generation ("5G") core network (i.e., "5GC") in a Public Land Mobile Network ("PLMN"). In wireless networks, the 5G System supports a registration procedure with AMF re-allocation when the initial AMF is unable to serve the UE due to UE's slice subscription information and slice related service requirements.

BRIEF SUMMARY

Disclosed are procedures for network function reallocation with security context. Said procedures may be implemented by apparatus, systems, methods, and/or computer program products.

One method of a network function (e.g., Source AMF) in a mobile communication network includes detecting, at a first network function of a mobile wireless communication network, that the first network function cannot serve a requested network slice from a user equipment ("UE") device. In further embodiments, the method includes sending, from the first network function via a second network function, a reroute message to a third network function of the mobile wireless communication network. The reroute message comprises an initial non-access stratum ("NAS") message retrieved during NAS security mode command ("SMC") procedure with the UE device and a security configuration. The third network function uses the initial NAS message and the security configuration to determine a security context for the UE device and serve the requested network slice from the UE device.

Another method of a network function (e.g., Target AMF) includes receiving, at a first network function of a mobile wireless communication network, an initial non-access stratum ("NAS") message from a second network function. The initial NAS message comprising an identifier indicating that the mobile wireless communication network supports an access and mobility management function ("AMF") change for isolated slices feature. In certain embodiments, the method includes determining a security context for a user equipment device ("UE") based on the initial NAS message from the second network function.

A further method of a network function (e.g., AUSF) includes receiving, at a first network function, an authentication request from a second network function for a user equipment ("UE") device. The authentication request comprising a public remote unit identifier. In certain embodiments, the method includes verifying, at the first network function, a previously-determined authentication result based on the public remote unit identifier. In some embodiments, the method includes determining, at the first network function, a first security key $K_{SEAF}$ without performing primary authentication with the UE device. In one embodiment, the method includes selecting, at the first network function, a private remote unit identifier based on the public remote unit identifier. In further embodiments, the method includes sending, from the first network function, in response to the authentication request, to the second network function, a message comprising an authentication result, the private remote unit identifier, and the first security key $K_{SEAF}$.

One method of a user equipment device ("UE") includes receiving, within a registration dialog, a first non-access stratum ("NAS") security mode command ("SMC") request message from a first network function. The first NAS SMC request message comprising a first identifier indicating support of an access and mobility management function ("AMF") change for isolated slices feature in a mobile wireless communication network. In further embodiments, the method includes receiving, within the registration dialog, a second NAS SMC request message from a second network function. The second NAS SMC request message comprising a second identifier indicating support of an AMF change for isolated slices feature in the mobile wireless communication network. In certain embodiments, the fourth method includes creating, a new security context similar to a security context used at the first network function based on an AMF key $K_{AMF}$, new NAS keys, and a security key $K_{SEAF}$.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2C is a continuation of FIG. 2A and depicts a signal flow diagram illustrating an option of reusing a security context from a source AMF;

FIG. 3 is a signal flow diagram illustrating mobility registration at a target AMF with new security context;

FIG. 8 is a flowchart diagram illustrating another embodiment of a method for network function reallocation with security context; and FIG. 9 is a flowchart diagram illustrating another embodiment of a method for network function reallocation with security context.

DETAILED DESCRIPTION

Figure 1:
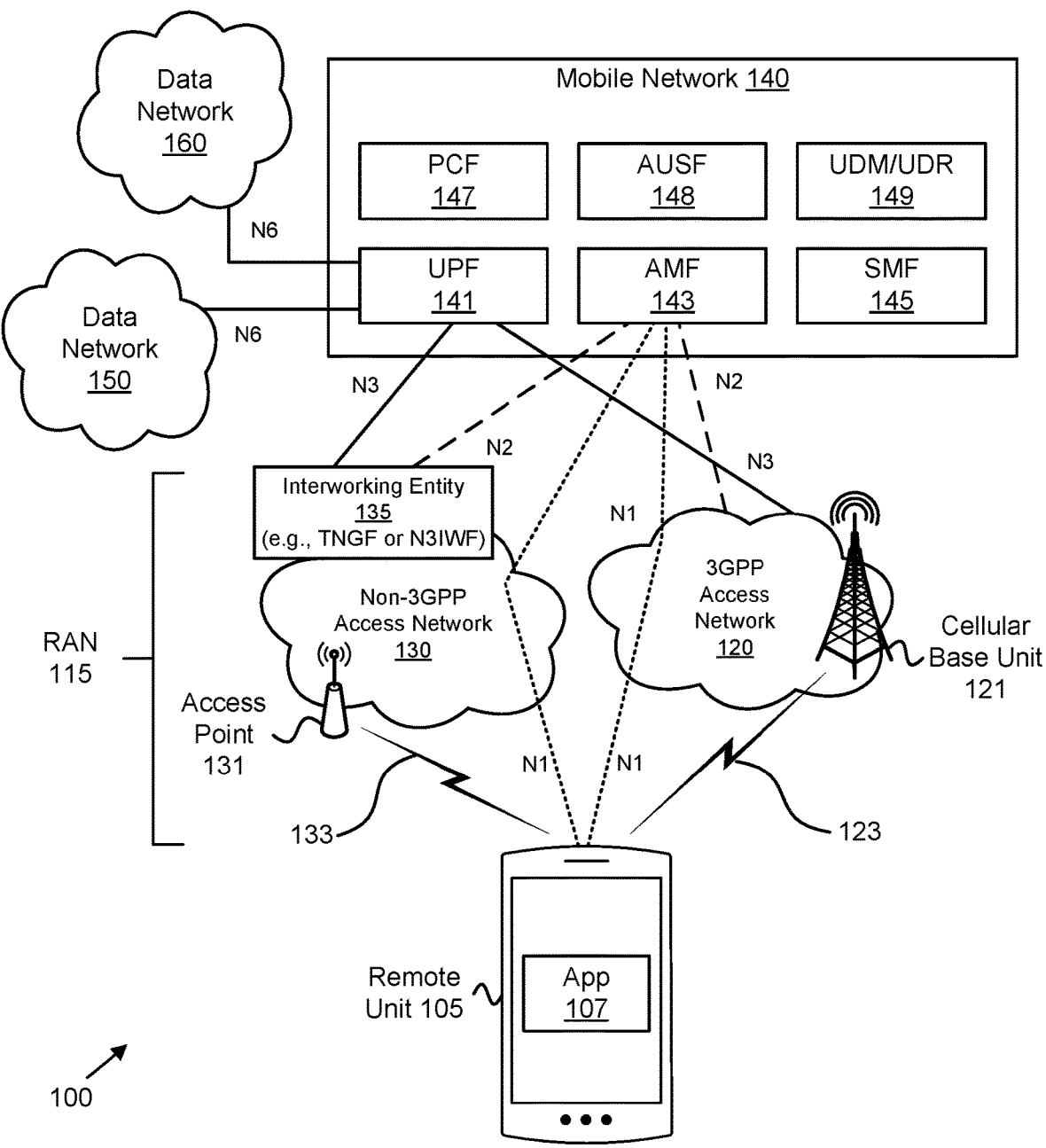
FIG. 1 is a schematic block diagram illustrating one embodiment of a wireless communication system for network function reallocation with security context.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for network function reallocation with security context. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

A wireless communication network system, such as a 5G system, may support a registration procedure with an access and mobility management function ("AMF") re-allocation when the initial AMF is unable to serve the user equipment ("UE") due to UE's slice subscription information and slice related service requirements. In case of deployments with strict slice isolation, no N14 interface may be supported between initial AMF and target AMF reallocation based on slice subscription. In the absence of an N14 interface, the target AMF will not be able to fetch the NAS security context from the initial AMF to handle the UE's registration request as illustrated in the following scenarios:

Scenario 1—During initial registration, the target AMF cannot handle the received rerouted non-access stratum ("NAS") message (e.g., the initial UE message) as the rerouted NAS message does not contain any NAS security context (because it is routed via a radio access network ("RAN")), and the target AMF also will not have access to the UE's security context nor subscription profile due to lack of connectivity to the source AMF.

Scenario 2—Once the UE is registered and has established security with the initial AMF/Source AMF, upon the UE's mobility to a different area, the UE sends the registration request of type 'mobility registration update' to the target AMF, where the target AMF in the absence of N14 interface cannot fetch the UE security context (e.g., NAS security context) from the Source AMF and cannot handle the received registration request message, which is both integrity and confidentiality protected.

The solution described herein to the problem above is to recreate the same security context at the target AMF already established at the source AMF. The security command messages to establish the security association between AMF and UE as well as UE and gNB are triggered by two different AMFs. Further, the AUSF provides an authentication status in case of re-routing or mobility registration so that a new, full authentication run is avoided.

FIG. 1 depicts a wireless communication system 100 for network function reallocation with security context, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, regarding conventional registration with AMF re-allocation when the initial AMF is unable to serve the UE, the NAS message received from the UE is rerouted to another target AMF either directly over the AMF-to-AMF interface e.g., N14, or via RAN. In conventional systems, however, the reroute via RAN may only be possible during initial registration. Once the UE has registered and established security with the network, the direct reroute is possible only afterwards. The reason for this is that the current security mechanisms rely heavily on the assumption that AMFs can communicate directly.

The dependency on this assumption goes to the extent that the security specifications prohibit the UE from accepting unprotected messages from the core once security has been established. Therefore, whilst a registered UE is moving from one area to another, it is assumed that the target AMF is always able to retrieve the security context from an old AMF that used to serve the UE. In case a reroute via RAN takes place, and the target AMF is unable to retrieve the UE security context, then the target AMF is not able to trigger a new authentication procedure in order to establish a new security context. In fact, the target AMF would not be able to communicate with the UE in the first place since all the unprotected downlink messages will be dismissed by the UE.

The need to support the indirect reroute procedure for registered UEs has become apparent. The intention is to enable deployment scenarios with stricter slice isolation requirements on the core network, for example where the AMFs are unable to communicate with each other.

Therefore, for deployments that require strict slice isolation, no N14 interface may be supported and so direct reroute, and retrieval of UE NAS security context is not possible. In case of RAN rerouting to support slice isolation, the NAS message alone is rerouted, and the UE NAS security context cannot be rerouted via RAN from the Initial AMF to Target AMF considering the security of NAS security context.

Regarding protection of initial NAS message, the initial NAS message is the first NAS message that is sent after the UE transitions from the idle state. The UE shall send a limited set of information elements ("IEs") (called the cleartext IEs), including those needed to establish security in the initial message when it has no NAS security context. When the UE has a NAS security context, the UE shall send a message that has the complete initial NAS message ciphered in a NAS Container along with the cleartext IEs with whole message integrity protected. The complete initial message is included in the NAS Security Mode Complete message in a NAS Container when needed (e.g., AMF cannot find the used security context) in the latter case and always in the former case. Whereas the cleartext IEs include subscription identifiers (e.g., subscription concealed identifier ("SUCI") or global unique temporary identifier ("GU-TIs")), UE security capabilities, ngKSI, an indication that the UE is moving from evolved packet core ("EPC"), additional GUTIs, and IEs containing the tracking area update ("TAU") request in the case idle mobility from long term evolution ("LTE"), for instance.

Therefore, considering the above features, unless the target AMF has access to the UE security context, the target AMF cannot handle the registration request in either case described. There is no solution for the UE NAS security context transfer to target AMF to support scenarios (i) AMF reallocation during registration and (ii) registration mobility update, in the absence of N14 interface.

To solve the problem of a target AMF not being able to fetch the NAS security context from the initial AMF to handle a UE's registration request, described above, the present disclosure proposes solutions that recreate the same security context at the target AMF already established at the source AMF.

Beneficially, the claimed solution utilizes security command messages to establish the security association between an AMF and a UE as well as a UE and a gNB are that are triggered by two different AMFs. Further, the AUSF provides an authentication status in the event of re-routing or mobility registration so that a new full authentication run is avoided.

Figure 2A:
FIG. 2A is a signal flow diagram illustrating one embodiment of a procedure for a precondition for rerouting.

FIG. 2A depicts a signal flow diagram 200 illustrating one embodiment of solution for AMF reallocation with security context recreation. In this embodiment the $K_{SEAF}$ is kept in the AUSF as well as the authentication status from the UE at the Source AMF.

At Step 1 and Step 2a, the UE 201 sends (see messaging 213) an initial registration NAS message to the source AMF 205. The source AMF 205 may trigger the identity request procedure (see block 215) to request the SUCI for the UE 201.

At step 2b, the AUSF 211 performs (see block 217) authentication and key agreement with the UE 201 according to normal procedures. A new indication is introduced in the NAS security mode command ("SMC") to indicate to the UE 201 the support of the feature "AMF change for isolated slices" in the network and that the UE 201 may get challenged with an additional NAS SMC directly after the one from the Source AMF 205.

As step 3, if the AMF relocation features are supported in the network, the AUSF 211 stores (see block 218) the authentication result, SUPI/SUCI, and keys $K_{SEAF}$ and/or $K_{AUSF}$. The SUCI is used to identify the $K_{SEAF}$ and thus leads to the recreation of the same or new security context in the Target AMF 207, described below. At step 4, further optional steps (see block 219) may be carried out according to TS 23.502.

Figure 2B:
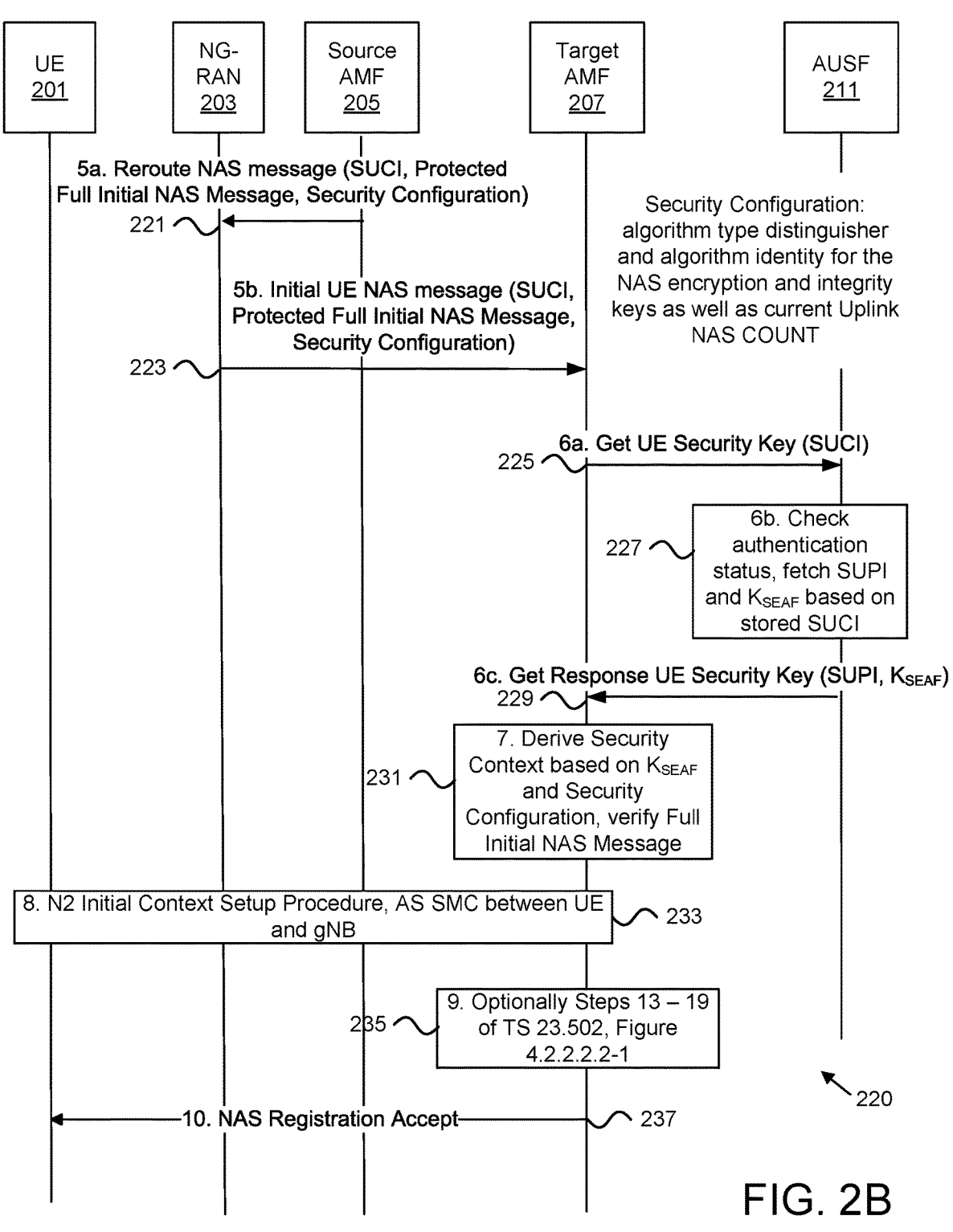
FIG. 2B is a continuation of FIG. 2A and depicts a signal flow diagram illustrating an option of reusing a security context from a source AMF.

Two options may be considered with reuse or with a new security context in the Target AMF 207. In one embodiment of a first option, as shown in FIG. 2B, a source AMF 205 sends a protected initial NAS message from the UE 201 to the Target AMF 207.

At Steps 5a-5b, the Source AMF 205 detects that it cannot serve the requested slice(s) (e.g., network slice selection assistance information ("NSSAIs")) from the UE 201 and that N14 for direct AMF communication is not available. The Source AMF 205 sends (see messaging 221 and 223), via the NG-RAN 203 to the Target AMF 207, the initial NAS message (e.g., which may be the full initial NAS message retrieved during NAS SMC, as shown above in FIG. 1, step 2b) protected with the current NAS security context and includes an unprotected SUCI and the security configuration, e.g., the security context in the Source AMF 205 without the keys, e.g., the algorithm type distinguisher and algorithm identity for the NAS encryption and integrity keys as well as current uplink NAS COUNT for the key $K_{gNB}$. The security configuration may include a keyAmfHDerivationInd parameter that indicates the "way" of key derivation at the Target AMF 307, e.g., H=Horizontal and there may also be a V=Vertical possibility.

Other parameters such as the length of the previous information elements or the access type distinguisher may be sent as well or simply determined at the Target AMF 207. With that, the Target AMF 207 can derive the same keys after retrieving the $K_{SEAF}$ from the AUSF 211. In this case no NAS SMC is required later on.

At Step 6a, the Target AMF 207 (and/or a security anchor function ("SEAF")) contacts (see messaging 225) the AUSF 211 for the same key $K_{SEAF}$ provided to the Source AMF 205 based on the SUCI since inputs to the $K_{SEAF}$ derivation did not change. The message may be a Nausf_UEAuthentication_Authenticate request message or a new key request message since the Target AMF 207 is aware of the ongoing AMF relocation due to isolated slices, e.g., the Target AMF 207 can distinguish whether the request is coming from a Source AMF 205 or directly from a UE 201.

At Step 6b, the AUSF 211 verifies (see block 227), based on previously-stored authentication results, whether a new authentication process is required or whether the same $K_{SEAF}$ can be reused again. The AUSF 211 may consider to derive the $K_{SEAF}$ again if it only stored the $K_{AUSF}$, else it fetches the stored $K_{SEAF}$.

At Step 6c, the AUSF 211 provides (see messaging 229) the subscription permanent identifier ("SUPI") and $K_{SEAF}$ to the Target AMF 207. The message may be a Nausf_UEAuthentication_Authenticate response message and may additionally include the stored (e.g., successful) authentication result, or a new message returning the parameters.

At step 7, the Target AMF 207 derives (see block 231) the key $K_{AMF}$ and the NAS keys using the security configuration (e.g., algorithm type distinguisher and algorithm identity for the NAS encryption and integrity keys, as well as the current Uplink NAS COUNT for the $K_{gNB}$, etc.) to derive exactly the same security context as in the Source AMF 205. The Target AMF 207 may now decrypt and verify the initial NAS message. The security configuration may include a keyAmfHDerivationInd parameter that indicates the "way" of key derivation at the Target AMF 307, e.g., H=Horizontal and there may also be a V=Vertical possibility.

At step 8, the Target AMF 207 initiates (see block 233) the access stratum ("AS") SMC by provisioning the gNB key $K_{gNB}$ and the UL NAS COUNT to the gNB. The AS SMC is now sent by a different AMF than the NAS SMC before.

At step 9, optional steps (see block 235) according to TS 23.502 may be carried out. At step 10, afterwards the Target AMF 207 sends (see messaging 237) the NAS registration accept message to the UE 201, which may be protected with the NAS keys derived in the Target AMF 207.

In one embodiment of a second option, as shown in FIG. 2C, a new security context is derived as a Target AMF 207.

At Steps 5a-5b, the Source AMF 205 detects that it cannot serve the requested slice(s) (NSSAIs) from the UE 201 and that N14 for direct AMF communication is not available. The Source AMF 205 sends (see messaging 241 and 243) an unprotected initial NAS message (which may be the full initial NAS message retrieved during NAS SMC, as shown above in FIG. 1, step 2b) with SUCI and Uplink NAS COUNT to the Target AMF 207 via the NG-RAN 203.

At step 6a, the target AMF 207 (and/or SEAF) contacts (see messaging 245) the AUSF 211 for the same key $K_{SEAF}$ since inputs to the $K_{SEAF}$ derivation did not change. The message may be a Nausf_UEAuthentication_Authenticate request message or a new key request message since the Target AMF 207 is aware of the ongoing AMF relocation due to isolated slices, e.g., the AMF can distinguish whether the request is coming from a Source AMF 205 or directly from a UE 201.

At step 6b, the AUSF 211 verifies (see block 247), based on previously-stored authentication result, whether a new authentication process is required or whether the same key $K_{SEAF}$ can be reused again. The AUSF 211 may consider to derive the key $K_{SEAF}$ from the key $K_{AUSF}$ again if it only stored the key $K_{AUSF}$, else it fetches the stored key $K_{SEAF}$.

At step 6c, the AUSF 211 provides (see messaging 249) the SUPI and the key $K_{SEAF}$ to the Target AMF 207. The message may be a Nausf_UEAuthentication_Authenticate response message and may in addition include the stored (e.g., successful) authentication result, or a new message returning the parameters.

At step 7, the Target AMF 207 derives (see block 251) a new key $K_{AMF}$ and new NAS keys and creates a new security context for the UE 201.

At step 8, the Target AMF 207 performs (see block 253) a fresh NAS SMC with the UE 201. The UE 201 knows that another NAS SMC within the same registration dialog can occur due to a new indication in the NAS SMC from the Source AMF 205. The Target AMF 207 then provides the UL NAS COUNT and the key K$_{gNB}$ to the gNB for an AS SMC with the UE 201.

At step 9, optional steps (see block 255) according to TS 23.502 may be carried out. At step 10, afterwards the Target AMF 207 sends (see messaging 257) the NAS Registration Accept message to the UE 201, which is protected with the new NAS keys derived in the Target AMF 207.

In a further embodiment, depicted in FIG. 3, mobility registration at a new Target AMF with a new security context is described. This embodiment proposes to skip a full primary authentication run at the Target AMF which cannot reach the Source AMF and does not have any subscription profile available.

At step 0, the UE 301 is registered (see block 313) in the network and served by the Source AMF 305. Due to mobility, the UE 301 is leaving the AMF area and the NG-RAN 303 is not able to select the Source AMF 305 based on the 5G-GUTI.

At step 1, the UE 301 sends (see messaging 315) a mobility registration message to the Target AMF 307. The NG-RAN 303 may have selected the Target AMF 307 because the Source AMF 305 is not available.

At step 2, the Target AMF 307 recognizes (see block 317) the 5G-GUTI and that the Source AMF 305 cannot be reached by the Target AMF 307.

At step 3, the Target AMF 307 initiates an identity request procedure (see messaging 319) and receives (see messaging 321) the SUCI from the UE 301. The SUCI may be fresh generated or may be kept after the last successful registration.

At step 4a, the Target AMF 307 (and/or the SEAF) may initiate an authentication request to the AUSF 311 and provides the SUCI. The message may be a Nausf_UEAuthentication_Authenticate request message or a new key request message.

At step 4b, the AUSF 311 verifies (see block 325) the request. If the SUCI did not change and the AUSF 311 can determine the corresponding authentication result and the key K$_{SEAF}$, then the AUSF 311 continues with step 4c; otherwise, the AUSF 311 contacts the UDM/SIDF 309 to retrieve the SUPI. The AUSF 311 may send an Nudm_UE-Authentication_Get Request to the UDM 309 and the UDM 309 may answer with a Nudm_UEAuthentication_Get Response message. The UDM 309 may include a new authentication vector according to normal procedures.

At step 4c, the AUSF 311 determines (see block 327) the data record of the UE 301 based on SUPI or SUCI and verifies, based on a previously-stored authentication result, whether a new authentication run is required or whether the same key K$_{SEAF}$ can be reused again. The AUSF 311 may derive the key K$_{SEAF}$ from the key K$_{AUSF}$ again if it only stored the key K$_{AUSF}$, else it fetches the stored key K$_{SEAF}$.

At step 4d, the AUSF 311 provides (see messaging 329) SUPI and the key K$_{SEAF}$ to the Target AMF 307. The message may be a Nausf_UEAuthentication_Authenticate response message and may include the stored (e.g., successful) authentication result, or a new message returning the parameters.

At step 5, the Target AMF 307 recognizes (see block 331) that no authentication is required because it received already the key K$_{SEAF}$ and SUPI and authentication result. The Target AMF 307 then derives a new key K$_{AMF}$ and new NAS keys and creates a new security context for the UE 301.

At step 6, the Target AMF 307 performs (see block 333) a fresh NAS SMC to the UE 301. The Target AMF 307 then triggers AS SMC towards NG-RAN 303 with the UE 301.

At step 9, optional steps according to TS 23.502 may be carried out (see block 335). At Step 10, afterwards the Target AMF 307 sends (see messaging 337) the NAS Registration Accept message to the UE 301, protected with the new NAS keys derived in the Target AMF 307.

Figure 4:
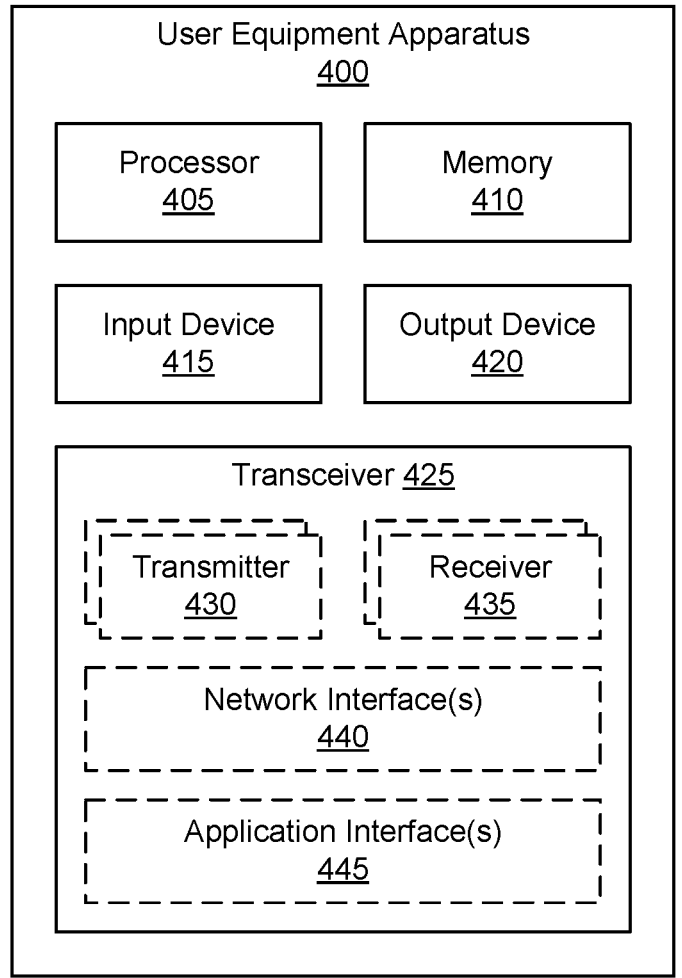
FIG. 4 is a block diagram illustrating one embodiment of a user equipment apparatus that may be used for network function reallocation with security context.

FIG. 4 depicts a user equipment apparatus 400 that may be used for network function reallocation with security context, according to embodiments of the disclosure. In various embodiments, the user equipment apparatus 400 is used to implement one or more of the solutions described above. The user equipment apparatus 400 may be one embodiment of the remote unit 105 and/or the UE 205, described above. Furthermore, the user equipment apparatus 400 may include a processor 405, a memory 410, an input device 415, an output device 420, and a transceiver 425.

In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. In some embodiments, the transceiver 425 communicates with one or more cells (or wireless coverage areas) supported by one or more base units 121. In various embodiments, the transceiver 425 is operable on unlicensed spectrum. Moreover, the transceiver 425 may include multiple UE panel supporting one or more beams. Additionally, the transceiver 425 may support at least one network interface 440 and/or application interface 445. The application interface(s) 445 may support one or more APIs. The network interface(s) 440 may support 3GPP reference points, such as Uu, N1, PCS, etc. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425. In certain embodiments, the processor 405 may include an application processor (also known as "main processor") which manages application-domain and operating system ("OS") functions and a baseband processor (also known as "baseband radio processor") which manages radio functions.

In various embodiments, the processor 405 controls the user equipment apparatus 400 to implement the above described UE behaviors. For example, a transceiver 425 may be configured to receive, within a registration dialog, a first non-access stratum ("NAS") security mode command ("SMC") request message from a first network function. The transceiver 425 may receive, within the registration dialog, a second NAS SMC request message from a second network function. The processor 405 may create a new security context similar to a security context used at the first network function based on an AMF key $K_{AMF}$, new NAS keys, and a security key $K_{SEAF}$.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to network function reallocation with security context. For example, the memory 410 may store various parameters, security contexts, keys, resource assignments, policies, and the like as described above. In certain embodiments, the memory 410 also stores program code and related data, such as an operating system or other controller algorithms operating on the user equipment apparatus 400.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all, or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 includes at least transmitter 430 and at least one receiver 435. One or more transmitters 430 may be used to provide UL communication signals to a base unit 121, such as the UL transmissions described herein. Similarly, one or more receivers 435 may be used to receive DL communication signals from the base unit 121, as described herein. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
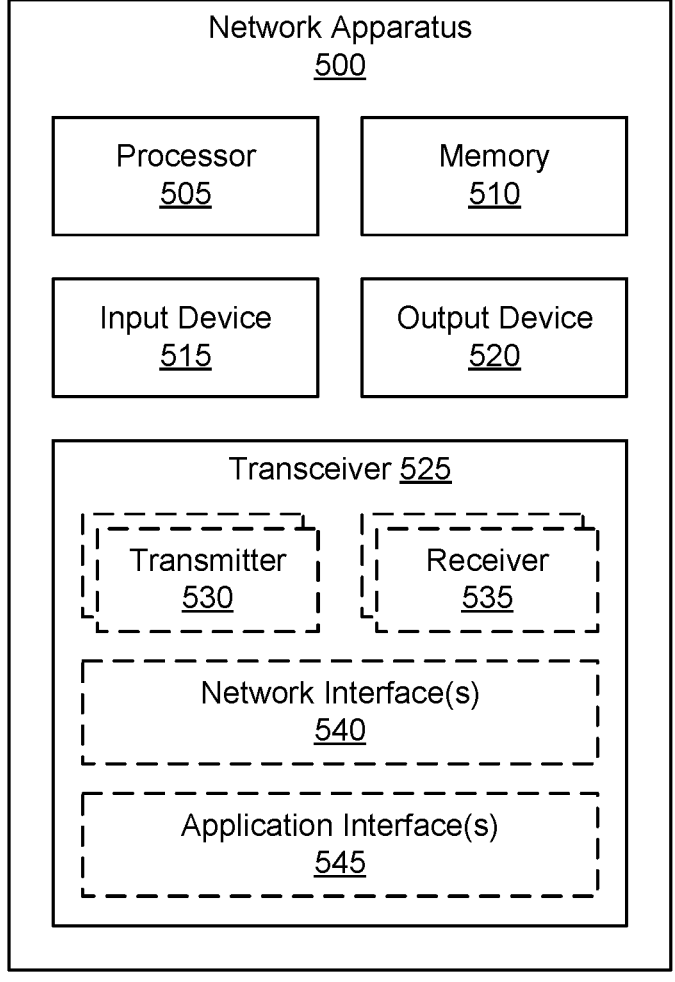
FIG. 5 is a block diagram illustrating one embodiment of a network apparatus that may be used for network function reallocation with security context.

FIG. 5 depicts a network apparatus 500 that may be used for network function reallocation with security context, according to embodiments of the disclosure. In one embodiment, network apparatus 500 may be one implementation of a RAN node, such as the base unit 121, the RAN node 210, or gNB, described above. Furthermore, the base network apparatus 500 may include a processor 505, a memory 510, an input device 515, an output device 520, and a transceiver 525.

In some embodiments, the input device 515 and the output device 520 are combined into a single device, such as a touchscreen. In certain embodiments, the network apparatus 500 may not include any input device 515 and/or output device 520. In various embodiments, the network apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. Here, the transceiver 525 communicates with one or more remote units 105. Additionally, the transceiver 525 may support at least one network interface 540 and/or application interface 545. The application interface(s) 545 may support one or more APIs. The network interface(s) 540 may support 3GPP reference points, such as Uu, N1, N2 and N3. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 500 is an AMF, AUSF, UDM, or other NR-RAN network function, described above. In such embodiments, the processor 505 may detect, at a first network function of a mobile wireless communication network, that the first network function cannot serve a requested network slice from a user equipment ("UE") device. In another embodiment, a transceiver 525 sends, from the first network function via a second network function, a reroute message to a third network function of the mobile wireless communication network.

In one embodiment, the processor 505 is configured to initiate primary authentication with the UE prior to sending the initial non-access stratum ("NAS") message. In certain embodiments, the processor 505 is configured to detect, at a fourth network function, that the mobile wireless communication network supports an access and mobility management function ("AMF") change for isolated slices feature and perform, at the first network function, a non-access stratum ("NAS") security mode command ("SMC") with the UE device.

In one embodiment, the transceiver 525 is configured to receive, at a first network function of a mobile wireless communication network, an initial non-access stratum ("NAS") message from a second network function. In some embodiments, the processor 505 is configured to determine a security context for a user equipment device ("UE") based on the initial NAS message from the second network function.

In one embodiment, the transceiver 525 is configured to send, from the first network function, a request to a third network function to initiate primary authentication with the UE device. In further embodiments, the transceiver 525 is configured to receive, from the third network function, a message in response to the request.

In one embodiment, the processor 505 is configured to determine, by the first network function, based on the received authentication result, that primary authentication does not need to be performed. In various embodiments, the processor 505 is configured to determine the security context by recreating, at the first network function, a same security context that is used in the second network function based on the security configuration and the security key $K_{SEAF}$. In one embodiment, the processor 505 is configured to initiate access stratum security mode command ("AS SMC") between the first network function and the UE by provisioning a base unit key $K_{gNB}$ and the current uplink NAS count to the base unit.

In one embodiment, the processor 505 is configured to derive, at the first network function, an AMF key $K_{AMF}$ and NAS keys and determining the security context by creating, at the first network function, a security context based on the AMF key $K_{AMF}$, NAS keys, and the security key $K_{SEAF}$. In one embodiment, the transceiver 525 is configured to send, from the first network function, a NAS security mode command ("SMC") request message to the UE.

In one embodiment, the transceiver 525 is configured to receive, at a first network function, an authentication request from a second network function for a user equipment ("UE") device. In certain embodiments, the processor 505 is configured to verify, at the first network function, a previously-determined authentication result based on the public remote unit identifier.

In some embodiments, the processor 505 is configured to determine, at the first network function, a first security key $K_{SEAF}$ without performing primary authentication with the UE device. In one embodiment, the processor 505 is configured to select, at the first network function, a private remote unit identifier based on the public remote unit identifier. In further embodiments, the processor 505 is configured to send, from the first network function, in response to the authentication request, to the second network function, a message comprising an authentication result, the private remote unit identifier, and the first security key $K_{SEAF}$.

In various embodiments, the processor 505 is configured to perform primary authentication with the UE in response to receiving an authentication request message from a third network function and storing the authentication result, the public remote unit identifier, the private remote unit identifier, the first security key $K_{SEAF}$, and the second security key $K_{AUSF}$ based on the primary authentication.

In certain embodiments, the transceiver 525 is configured to, in response to not verifying the authentication result based on the public remote unit identifier, send, from the first network function, a request message comprising the public remote unit identifier to a fourth network function and receiving in response the private remote unit identifier. In one embodiment, the processor 505 is configured to verify the authentication result based on the private remote unit identifier and selecting one of a stored first security key $K_{SEAF}$ and a second security key $K_{AUSF}$ based on the authentication result.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to network function reallocation with security context. For example, the memory 510 may store parameters, configurations, resource assignments, policies, keys, security contexts, and the like, as described above. In certain embodiments, the memory 510 also stores program code and related data, such as an operating system or other controller algorithms operating on the network apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the network apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all, or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to communicate with the UE, as described herein. Similarly, one or more receivers 535 may be used to communicate with network functions in the NPN, PLMN and/or RAN, as described herein. Although only one transmitter 530 and one receiver 535 are illustrated, the network apparatus 500 may have any suitable number of transmitters 530 and receivers 535. Further, the transmitter(s) 530 and the receiver(s) 535 may be any suitable type of transmitters and receivers.

Figure 6:
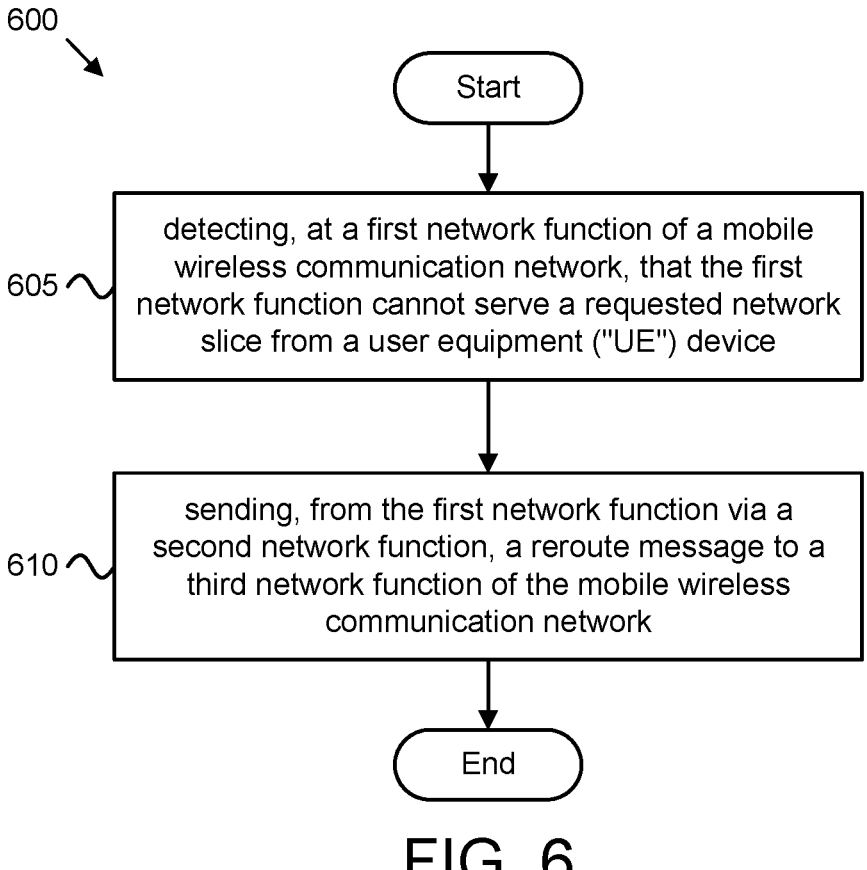
FIG. 6 is a flowchart diagram illustrating one embodiment of a method for network function reallocation with security context.

FIG. 6 is a flowchart diagram of a method 600 for network function reallocation with security context. The method 600 may be performed by a network device such as the network apparatus 500 described above with reference to FIG. 5. In some embodiments, the method 600 may be performed by a processor executing program code, for example, a microcontroller, a microprocessor, a CPU, a GPU, an auxiliary processing unit, a FPGA, or the like.

In one embodiment, the method 600 includes detecting 605, at a first network function of a mobile wireless communication network, that the first network function cannot serve a requested network slice from a user equipment ("UE") device. In further embodiments, the method 600 includes sending 610, from the first network function via a second network function [NG-RAN], a reroute message to a third network function [Target AMF] of the mobile wireless communication network. The method 600 ends.

Figure 7:
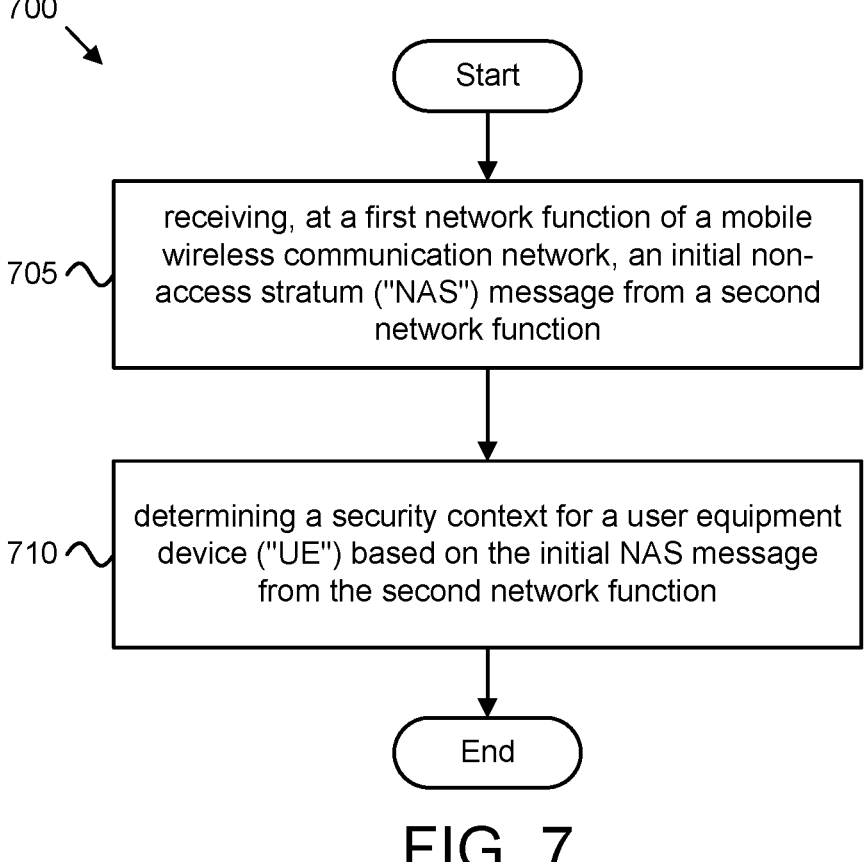
FIG. 7 is a flowchart diagram illustrating another embodiment of a method for network function reallocation with security context.

FIG. 7 is a flowchart diagram of a method 700 for network function reallocation with security context. The method 700 may be performed by a network device such as the network apparatus 500 described above with reference to FIG. 5. In some embodiments, the method 700 may be performed by a processor executing program code, for example, a microcontroller, a microprocessor, a CPU, a GPU, an auxiliary processing unit, a FPGA, or the like.

In one embodiment, the method 700 includes receiving 705, at a first network function of a mobile wireless communication network, an initial non-access stratum ("NAS") message from a second network function. In some embodiments, the method 700 includes determining 710 a security context for a user equipment device ("UE") based on the initial NAS message from the second network function. The method 700 ends.

FIG. 8 is a flowchart diagram of a method 800 for network function reallocation with security context. The method 800 may be performed by a network device such as the network apparatus 500 described above with reference to FIG. 5. In some embodiments, the method 800 may be performed by a processor executing program code, for example, a microcontroller, a microprocessor, a CPU, a GPU, an auxiliary processing unit, a FPGA, or the like.

In one embodiment, the method 800 includes receiving 805, at a first network function, an authentication request from a second network function for a user equipment ("UE") device. In further embodiments, the method 800 includes verifying 810, at the first network function, a previously-determined authentication result based on the public remote unit identifier.

In one embodiment, the method 800 includes determining 815, at the first network function, a first security key $K_{SEAF}$ without performing primary authentication with the UE device. In some embodiments, the method 800 includes selecting 820, at the first network function, a private remote unit identifier based on the public remote unit identifier. In some embodiments, the method 800 includes sending 825, from the first network function, in response to the authentication request, to the second network function, a message comprising an authentication result, the private remote unit identifier, and the first security key $K_{SEAF}$. The method 800 ends.

FIG. 9 is a flowchart diagram of a method 900 for network function reallocation with security context. The method 900 may be performed by a UE as described herein, for example, the remote unit 105 and/or the user equipment apparatus 400. In some embodiments, the method 900 may be performed by a processor executing program code, for example, a microcontroller, a microprocessor, a CPU, a GPU, an auxiliary processing unit, a FPGA, or the like.

In one embodiment, the method 900 includes receiving 905, within a registration dialog, a first non-access stratum ("NAS") security mode command ("SMC") request message from a first network function. In further embodiments, the method 900 includes receiving 910, within the registration dialog, a second NAS SMC request message from a second network function. In certain embodiments, the method 900 includes creating 915, a new security context similar to a security context used at the first network function based on an AMF key $K_{AMF}$, new NAS keys, and a security key $K_{SEAF}$. The method 900 ends.

A first method for network function reallocation with security context is disclosed. In one embodiment, the first method is performed by a network device such as the network apparatus 500 described above with reference to FIG. 5. In some embodiments, the first method may be performed by a processor executing program code, for example, a microcontroller, a microprocessor, a CPU, a GPU, an auxiliary processing unit, a FPGA, or the like.

In one embodiment, the first method includes detecting, at a first network function of a mobile wireless communication network, that the first network function cannot serve a requested network slice from a user equipment ("UE") device. In further embodiments, the first method includes sending, from the first network function via a second network function, a reroute message to a third network function of the mobile wireless communication network. The reroute message comprises an initial non-access stratum ("NAS") message retrieved during NAS security mode command ("SMC") procedure with the UE device and a security configuration. The third network function uses the initial NAS message and the security configuration to determine a security context for the UE device and serve the requested network slice from the UE device.

In one embodiment, the reroute message further comprises a subscription concealed identifier ("SUCI") and a security configuration. In some embodiments, the security configuration comprises one or more of an algorithm type distinguisher, an algorithm identity for non-access stratum ("NAS") encryption and integrity keys, and a current uplink NAS count.

In one embodiment, the reroute message comprises an initial non-access stratum ("NAS") message retrieved during NAS security mode command ("SMC") procedure with the UE that is protected with a NAS security context including unprotected security configuration without key information. In various embodiments, the unprotected security configuration without key information comprises a keyAmfHDerivationInd parameter.

In certain embodiments, the reroute message comprises an initial non-access stratum ("NAS") message retrieved during NAS security mode command ("SMC") procedure with the UE and a current uplink NAS count that are unprotected. In further embodiments, the first method includes initiating primary authentication with the UE prior to sending the initial non-access stratum ("NAS") message.

In one embodiment, the method includes detecting, at a fourth network function, that the mobile wireless communication network supports an access and mobility management function ("AMF") change for isolated slices feature and performing, at the first network function, a non-access stratum ("NAS") security mode command ("SMC") procedure with the UE device. The NAS SMC comprises an initial NAS message that comprises an indicator that the mobile wireless communication network supports the AMF change for isolated slices feature.

A first apparatus for network function reallocation with security context is disclosed. In one embodiment, the first apparatus may include a network device such as the network apparatus 500 described above with reference to FIG. 5. In some embodiments, the first apparatus includes a processor executing program code, for example, a microcontroller, a microprocessor, a CPU, a GPU, an auxiliary processing unit, a FPGA, or the like.

In one embodiment, the first apparatus includes a processor that is configured to detect, at a first network function of a mobile wireless communication network, that the first network function cannot serve a requested network slice from a user equipment ("UE") device. In further embodiments, the first apparatus includes a transceiver that is configured to send, from the first network function via a second network function, a reroute message to a third network function of the mobile wireless communication network. The reroute message comprises an initial non-access stratum ("NAS") message retrieved during NAS security mode command ("SMC") procedure with the UE device and a security configuration. The third network function uses the initial NAS message and the security configuration to determine a security context for the UE device and serve the requested network slice from the UE device.

In one embodiment, the reroute message further comprises a subscription concealed identifier ("SUCI") and a security configuration. In some embodiments, the security configuration comprises one or more of an algorithm type distinguisher, an algorithm identity for non-access stratum ("NAS") encryption and integrity keys, and a current uplink NAS count.

In one embodiment, the reroute message comprises an initial non-access stratum ("NAS") message retrieved during NAS security mode command ("SMC") procedure with the UE that is protected with a NAS security context including unprotected security configuration without key information. In various embodiments, the unprotected security configuration without key information comprises a keyAmfHDerivationInd parameter.

In certain embodiments, the reroute message comprises an initial non-access stratum ("NAS") message retrieved during NAS security mode command ("SMC") procedure with the UE and a current uplink NAS count that are unprotected. In further embodiments, the processor is configured to initiate primary authentication with the UE prior to sending the initial non-access stratum ("NAS") message.

In one embodiment, the processor is configured to detect, at a fourth network function, that the mobile wireless communication network supports an access and mobility management function ("AMF") change for isolated slices feature and perform, at the first network function, a non-access stratum ("NAS") security mode command ("SMC") procedure with the UE device. The NAS SMC comprises an initial NAS message that comprises an indicator that the mobile wireless communication network supports the AMF change for isolated slices feature.

A second method for network function reallocation with security context is disclosed. In one embodiment, the second method is performed by a network device such as the network apparatus 500 described above with reference to FIG. 5. In some embodiments, the second method may be performed by a processor executing program code, for example, a microcontroller, a microprocessor, a CPU, a GPU, an auxiliary processing unit, a FPGA, or the like.

In one embodiment, the second method includes receiving, at a first network function of a mobile wireless communication network, an initial non-access stratum ("NAS") message from a second network function. The initial NAS message comprising an identifier indicating that the mobile wireless communication network supports an access and mobility management function ("AMF") change for isolated slices feature. In certain embodiments, the second method includes determining a security context for a user equipment device ("UE") based on the initial NAS message from the second network function.

In one embodiment, the second method includes sending, from the first network function, a request to a third network function to initiate primary authentication with the UE device. In further embodiments, the second method includes receiving, from the third network function, a message in response to the request, the message comprising an authentication result, a remote unit identifier for the UE, and a security key $K_{SEAF}$ used at the second network function.

In one embodiment, the second method includes determining, by the first network function, based on the received authentication result, that primary authentication does not need to be performed. In further embodiments, the remote unit identifier for the UE comprises a subscription permanent identifier ("SUPI"). In one embodiment, the initial NAS message further comprises a security configuration comprising one or more of an algorithm type distinguisher, an algorithm identity for NAS encryption and integrity keys, and a current uplink NAS count.

In various embodiments, the second method includes determining the security context by recreating, at the first network function, a same security context that is used in the second network function based on the security configuration and the security key $K_{SEAF}$. In one embodiment, the second method includes initiating access stratum security mode command ("AS SMC") procedure between the first network function and the UE by provisioning a base unit key $K_{gNB}$ and the current uplink NAS count to the base unit.

In one embodiment, the second method includes deriving, at the first network function, an AMF key $K_{AMF}$ and NAS keys and determining the security context by creating, at the first network function, a security context based on the AMF key $K_{AMF}$, NAS keys, and the security key $K_{SEAF}$. In one embodiment, the second method includes sending, from the first network function, a NAS security mode command ("SMC") request message to the UE. The NAS SMC message comprises the identifier indicating that the mobile wireless communication network supports the AMF change for isolated slices feature.

A second apparatus for network function reallocation with security context is disclosed. In one embodiment, the second apparatus may include a network device such as the II) network apparatus 500 described above with reference to FIG. 5. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver configured to receive, at a first network function of a mobile wireless communication network, an initial non-access stratum ("NAS") message from a second network function. The initial NAS message comprising an identifier indicating that the mobile wireless communication network supports an access and mobility management function ("AMF") change for isolated slices feature. In certain embodiments, the second apparatus includes a processor that is configured to determine a security context for a user equipment device ("UE") based on the initial NAS message from the second network function.

In one embodiment, the transceiver is configured to send, from the first network function, a request to a third network function to initiate primary authentication with the UE device. In further embodiments, the transceiver is configured to receive, from the third network function, a message in response to the request, the message comprising an authentication result, a remote unit identifier for the UE, and a security key $K_{SEAF}$ used at the second network function.

In one embodiment, the processor is configured to determine, by the first network function, based on the received authentication result, that primary authentication does not need to be performed. In further embodiments, the remote unit identifier for the UE comprises a subscription permanent identifier ("SUPI"). In one embodiment, the initial NAS message further comprises a security configuration comprising one or more of an algorithm type distinguisher, an algorithm identity for NAS encryption and integrity keys, and a current uplink NAS count.

In various embodiments, the processor is configured to determine the security context by recreating, at the first network function, a same security context that is used in the second network function based on the security configuration and the security key $K_{SEAF}$. In one embodiment, the processor is configured to initiate access stratum security mode command ("AS SMC") procedure between the first network function and the UE by provisioning a base unit key $K_{gNB}$ and the current uplink NAS count to the base unit.

In one embodiment, the processor is configured to derive, at the first network function, an AMF key $K_{AMF}$ and NAS keys and determining the security context by creating, at the first network function, a security context based on the AMF key $K_{AMF}$, NAS keys, and the security key $K_{SEAF}$. In one embodiment, the transceiver is configured to send, from the first network function, a NAS security mode command ("SMC") request message to the UE. The NAS SMC message comprises the identifier indicating that the mobile wireless communication network supports the AMF change for isolated slices feature.

A third method for network function reallocation with security context is disclosed. In one embodiment, the third method is performed by a network device such as the network apparatus 500 described above with reference to FIG. 5. In some embodiments, the third method may be performed by a processor executing program code, for example, a microcontroller, a microprocessor, a CPU, a GPU, an auxiliary processing unit, a FPGA, or the like.

In one embodiment, the third method includes receiving, at a first network function, an authentication request from a second network function for a user equipment ("UE") device. The authentication request comprising a public remote unit identifier. In certain embodiments, the third method includes verifying, at the first network function, a previously-determined authentication result based on the public remote unit identifier.

In some embodiments, the third method includes determining, at the first network function, a first security key $K_{SEAF}$ without performing primary authentication with the UE device. In one embodiment, the third method includes selecting, at the first network function, a private remote unit identifier based on the public remote unit identifier. In further embodiments, the third method includes sending, from the first network function, in response to the authentication request, to the second network function, a message comprising an authentication result, the private remote unit identifier, and the first security key $K_{SEAF}$.

In one embodiment, the first security key $K_{SEAF}$ is determined using a stored first security key $K_{SEAF}$ based on the public remote unit identifier. In some embodiments, the first security key $K_{SEAF}$ is determined using a second security key $K_{AUSF}$, based on the public remote unit identifier, to derive the first security key $K_{SEAF}$ from the second security key $K_{AUSF}$.

In various embodiments, the third method includes performing primary authentication with the UE in response to receiving an authentication request message from a third remote unit identifier, the first security key $K_{SEAF}$, and the second security key $K_{AUSF}$ based on the primary authentication.

In certain embodiments, the third method includes, in response to not verifying the authentication result based on the public remote unit identifier, sending, from the first network function, a request message comprising the public remote unit identifier to a fourth network function and receiving in response the private remote unit identifier. In one embodiment, the third method includes verifying the authentication result based on the private remote unit identifier and selecting one of a stored first security key $K_{SEAF}$ and a second security key $K_{AUSF}$ based on the authentication result.

A third apparatus for network function reallocation with security context is disclosed. In one embodiment, the third apparatus may include a network device such as the network apparatus 500 described above with reference to FIG. 5. In some embodiments, the third apparatus includes a processor executing program code, for example, a microcontroller, a microprocessor, a CPU, a GPU, an auxiliary processing unit, a FPGA, or the like.

In one embodiment, the third apparatus includes a transceiver configured to receive, at a first network function, an authentication request from a second network function for a user equipment ("UE") device. The authentication request comprising a public remote unit identifier. In certain embodiments, the third apparatus includes a processor configured to verify, at the first network function, a previously-determined authentication result based on the public remote unit identifier.

In some embodiments, the processor is configured to determine, at the first network function, a first security key $K_{SEAF}$ without performing primary authentication with the UE device. In one embodiment, the processor is configured to select, at the first network function, a private remote unit identifier based on the public remote unit identifier. In further embodiments, the processor is configured to send, from the first network function, in response to the authentication request, to the second network function, a message comprising an authentication result, the private remote unit identifier, and the first security key $K_{SEAF}$.

In one embodiment, the first security key $K_{SEAF}$ is determined using a stored first security key $K_{SEAF}$ based on the public remote unit identifier. In some embodiments, the first security key $K_{SEAF}$ is determined using a second security key $K_{AUSF}$, based on the public remote unit identifier, to derive the first security key $K_{SEAF}$ from the second security key $K_{AUSF}$.

In various embodiments, the processor is configured to perform primary authentication with the UE in response to receiving an authentication request message from a third remote unit identifier, the first security key $K_{SEAF}$, and the second security key $K_{AUSF}$ based on the primary authentication.

In certain embodiments, the transceiver is configured to, in response to not verifying the authentication result based on the public remote unit identifier, send, from the first network function, a request message comprising the public remote unit identifier to a fourth network function and receiving in response the private remote unit identifier. In one embodiment, the processor is configured to verify the authentication result based on the private remote unit identifier and selecting one of a stored first security key $K_{SEAF}$ and a second security key $K_{AUSF}$ based on the authentication result.

A fourth method for network function reallocation with security context is disclosed. The fourth method may be performed by a UE as described herein, for example, the remote unit 105 and/or the user equipment apparatus 400. In some embodiments, the fourth method may be performed by a processor executing program code, for example, a microcontroller, a microprocessor, a CPU, a GPU, an auxiliary processing unit, a FPGA, or the like.

In one embodiment, the fourth method includes receiving, within a registration dialog, a first non-access stratum ("NAS") security mode command ("SMC") request message from a first network function. The first NAS SMC request message comprising a first identifier indicating support of an access and mobility management function ("AMF") change for isolated slices feature in a mobile wireless communication network.

In further embodiments, the fourth method includes receiving, within the registration dialog, a second NAS SMC request message from a second network function. The second NAS SMC request message comprising a second identifier indicating support of an AMF change for isolated slices feature in the mobile wireless communication network.

In certain embodiments, the fourth method includes creating, a new security context similar to a security context used at the first network function based on an AMF key $K_{AMF}$, new NAS keys, and a security key $K_{SEAF}$.

A fourth apparatus for network function reallocation with security context is disclosed. In one embodiment, the fourth apparatus may include a network device such as the network apparatus 500 described above with reference to FIG. 5. In some embodiments, the fourth apparatus includes a processor executing program code, for example, a microcontroller, a microprocessor, a CPU, a GPU, an auxiliary processing unit, a FPGA, or the like.

In one embodiment, the fourth apparatus includes a transceiver configured to receive, within a registration dialog, a first non-access stratum ("NAS") security mode command ("SMC") request message from a first network function. The first NAS SMC request message comprising a first identifier indicating support of an access and mobility management function ("AMF") change for isolated slices feature in a mobile wireless communication network.

In further embodiments, the transceiver is configured to receive, within the registration dialog, a second NAS SMC request message from a second network function. The second NAS SMC request message comprising a second identifier indicating support of an AMF change for isolated slices feature in the mobile wireless communication network.

In certain embodiments, the fourth apparatus includes a processor configured to create a new security context similar to a security context used at the first network function based on an AMF key $K_{AMF}$, new NAS keys, and a security key $K_{SEAF}$.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network equipment ("NE"), comprising:

at least one memory; and at least one processor coupled with the at least one memory and configured to cause the NE to:

determine that a first network function is unable to support a network slice requested by a user equipment ("UE"); and transmit, via a second network function, a reroute message to a third network function, the reroute message comprising an initial non-access stratum ("NAS") message retrieved during NAS security mode command ("SMC") procedure with the UE, an indication that transfer of a registration procedure from one access and mobility management function ("AMF") to another AMF that supports an isolated network slice without requiring the UE to perform a full primary authentication is supported, and a security configuration, wherein the third network function uses the initial NAS message and the security configuration to determine a security context for the UE and serve the requested network slice from the UE.

2. The NE of claim 1, wherein the reroute message further comprises a subscription concealed identifier ("SUCI").

3. The NE of claim 1, wherein the security configuration comprises one or more of an algorithm type distinguisher, an algorithm identity for NAS encryption and integrity keys, and a current uplink NAS count.

4. The NE of claim 1, wherein the reroute message comprises an initial NAS message retrieved during NAS SMC procedure with the UE that is protected with a NAS security context including unprotected security configuration without key information.

5. The NE of claim 4, wherein the unprotected security configuration without key information comprises a keyAmfHDerivationInd parameter.

6. The NE of claim 1, wherein the reroute message comprises an initial NAS message retrieved during NAS SMC procedure with the UE and a current uplink NAS count that are unprotected.

7. The NE of claim 1, wherein the at least one processor is configured to cause the NE to:

detect, at a fourth network function, the indication that transfer of the registration procedure from one AMF to another AMF that supports the isolated network slice without requiring the UE to perform the full primary authentication is supported; and perform, at the first network function, a NAS SMC procedure with the UE, the NAS SMC comprising an initial NAS message that comprises the indication that transfer of the registration procedure from one AMF to another AMF that supports the isolated network slice without requiring the UE to perform the full primary authentication is supported.

8. A network equipment ("NE"), comprising:

at least one memory; and at least one processor coupled with the at least one memory and configured to cause the NE to: p2 receive, at a first network function, an initial non-access stratum ("NAS") message from a second network function, the initial NAS message comprising an indication that transfer of a registration procedure from one access and mobility management function ("AMF") to another AMF that supports an isolated network slice without requiring a user equipment ("UE") to perform a full primary authentication is supported; and determine a security context for the UE based on the initial NAS message.

9. The NE of claim 8, wherein the at least one processor is configured to cause the NE to:

send, from the first network function, a request to a third network function to initiate primary authentication with the UE; and receive, from the third network function, a message in response to the request, the message comprising an authentication result, a remote unit identifier for the UE, and a security key $K_{SEAF}$ used at the second network function.

10. The NE of claim 9, wherein the remote unit identifier for the UE comprises a subscription permanent identifier ("SUPI").

11. The NE of claim 10, wherein the at least one processor is configured to cause the NE to verify the authentication result based on the SUPI and select a stored first security key $K_{SEAF}$ or second security key $K_{AUSF}$.

12. The NE of claim 9, wherein the at least one processor is configured to cause the NE to detect that primary authentication does not need to be performed based on the authentication result.

13. The NE of claim 9, wherein the at least one processor is configured to cause the NE to recreate a same security context as in the second network function based on security information in the initial NAS message and the security key $K_{SEAF}$.

14. The NE of claim 9, wherein the at least one processor is configured to cause the NE to create a new security context based on the security key $K_{SEAF}$.

15. The NE of claim 8, wherein the initial NAS message further comprises a security configuration comprising one or more of an algorithm type distinguisher, an algorithm identity for NAS encryption and integrity keys, and a current uplink NAS count.

16. The NE of claim 15, wherein the at least one processor is configured to cause the NE to:

determine the security context by recreating, at the first network function, a same security context that is used in the second network function based on the security configuration and a security key $K_{SEAF}$; and initiate access stratum security mode command ("AS SMC") procedure between the first network function and the UE by provisioning a key $K_{gNB}$ for a base unit and a current uplink NAS count to the base unit.

17. The NE of claim 16, wherein the at least one processor is configured to cause the NE to send a message to a network function to trigger the AS SMC procedure between the first network function and the UE.

18. The NE of claim 8, wherein the at least one processor is configured to cause the NE to:

derive, at the first network function, a AMF key $K_{AMF}$ and NAS keys; and determine the security context by creating, at the first network function, a security context based on the AMF key $K_{AMF}$, NAS keys, and a security key $K_{SEAF}$.

19. The NE of claim 18, wherein the at least one processor is configured to cause the NE to send, from the first network function, a NAS security mode command ("SMC") request message to the UE, the NAS SMC request message comprising the indication that transfer of the registration procedure from one AMF to another AMF that supports the isolated network slice without requiring the UE to perform the full primary authentication is supported.

20. A user equipment ("UE"), comprising:

at least one memory; and at least one processor coupled with the at least one memory and configured to cause the UE to:

receive, within a registration dialog, a first non-access stratum ("NAS") security mode command ("SMC")

request message from a first network function, the first NAS SMC request message comprising an indication that transfer of a registration procedure from one access and mobility management function ("AMF") to another AMF that supports an isolated network slice without requiring the UE to perform a full primary authentication is supported;

receive, within the registration dialog, a second NAS SMC request message from a second network function, the second NAS SMC request message comprising the indication that transfer of the registration procedure from one AMF to another AMF that supports the isolated network slice without requiring the UE to perform the full primary authentication is supported; and create a new security context similar to a security context used at the first network function based on an AMF key $K_{AMF}$, new NAS keys, and a security key $K_{SEAF}$.

* * * * *